April 15, 1952     J. O. YEAGER ET AL     2,592,991
STALK CUTTER
Filed Jan. 26, 1949     4 Sheets-Sheet 1
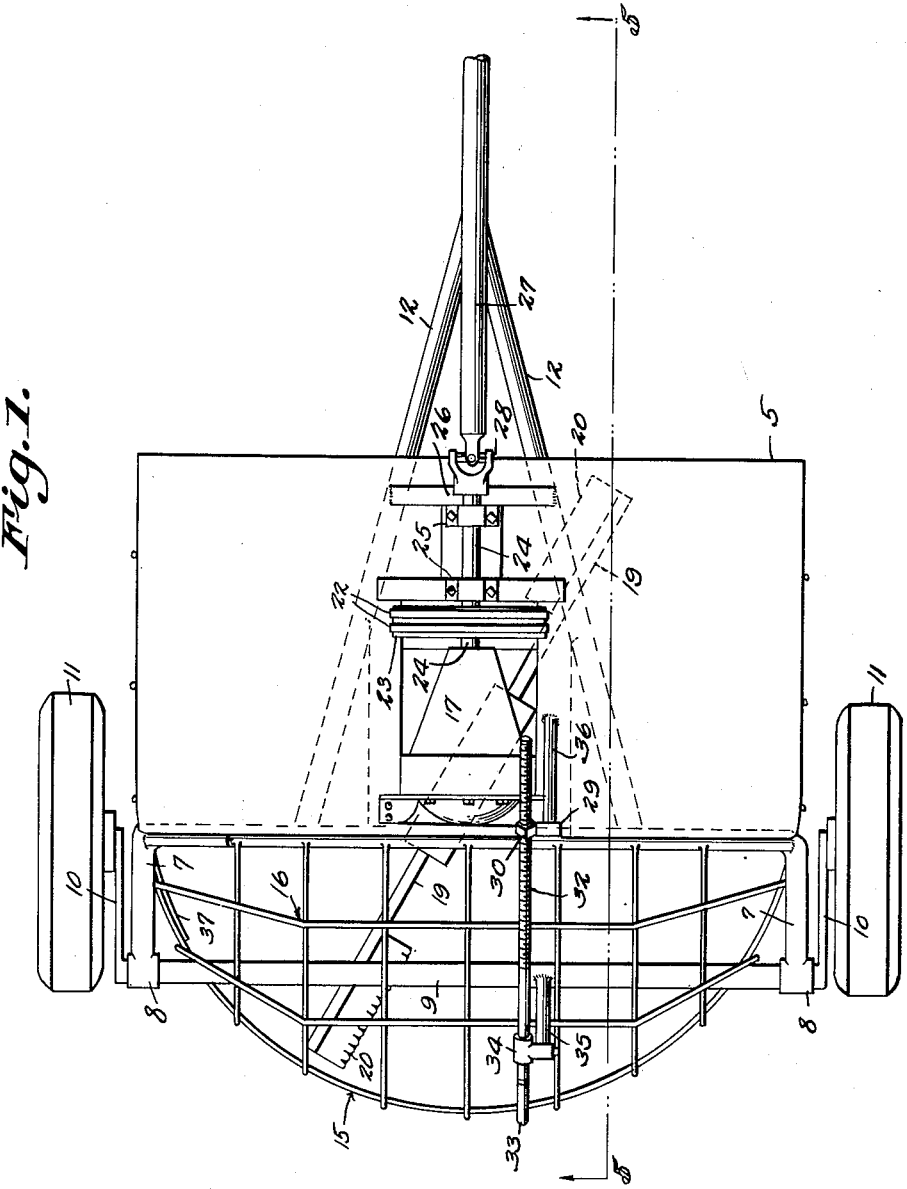
J. O. Yeager
G. A. Yeager
INVENTORS

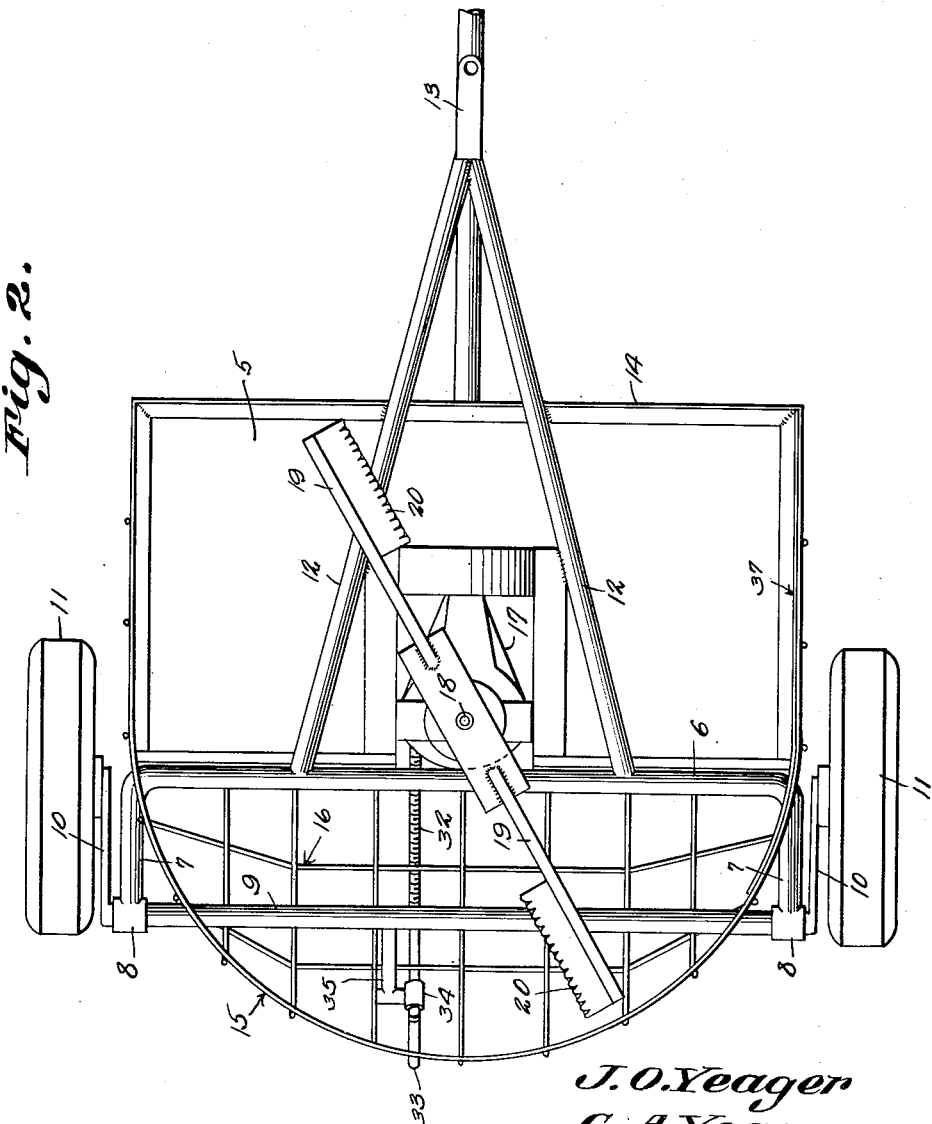

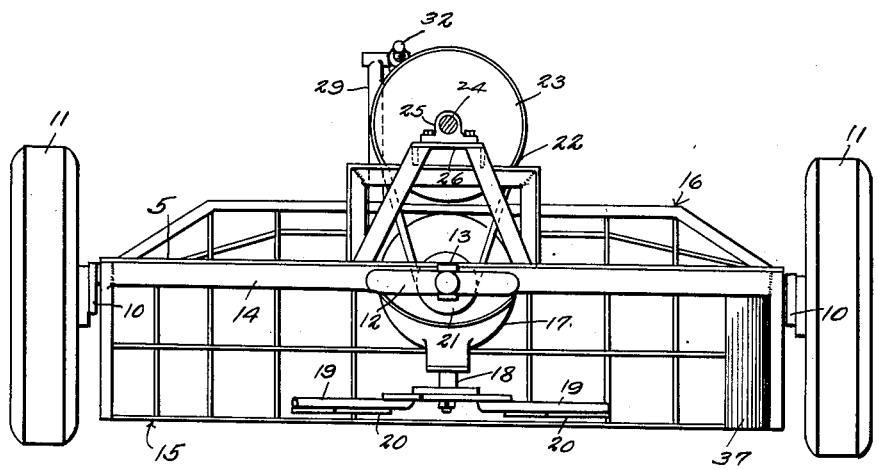
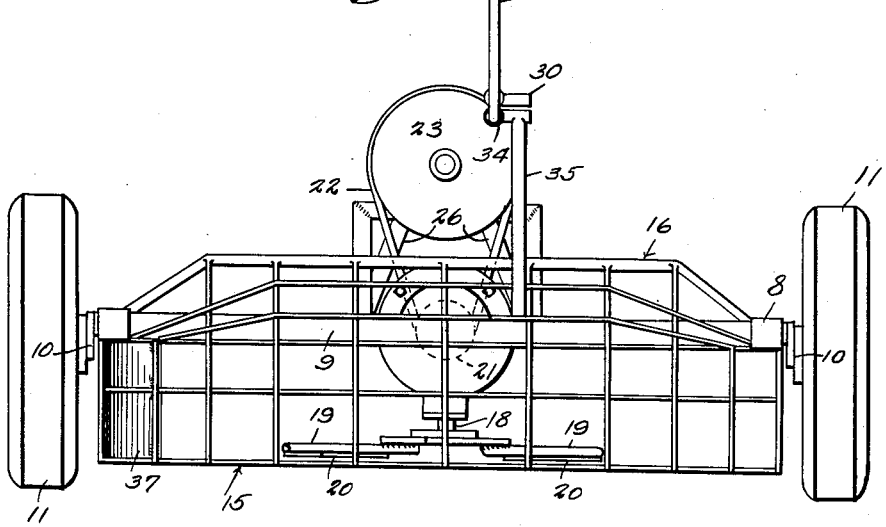

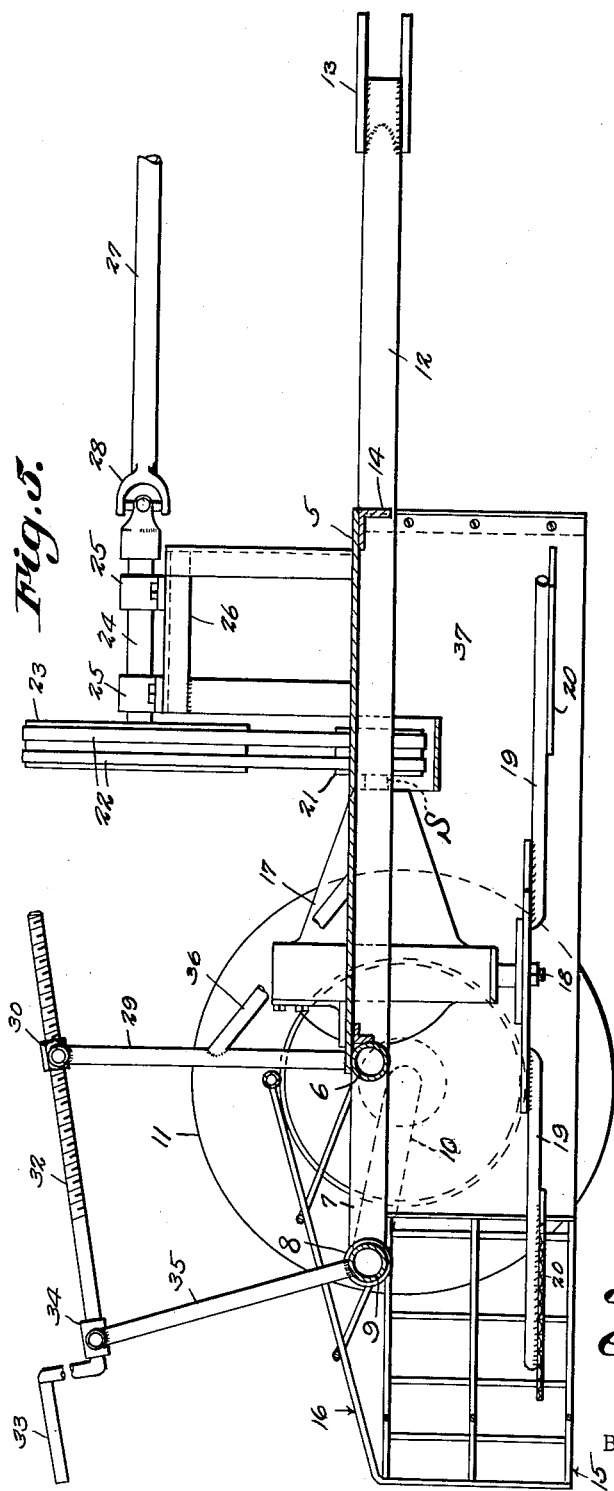

Patented Apr. 15, 1952

2,592,991

UNITED STATES PATENT OFFICE 2,592,991

STALK CUTTER

James O. Yeager and Garland A. Yeager, McGregor, Tex.

Application January 26, 1949, Serial No. 72,798

3 Claims. (Cl. 55—118)

This invention relates to agricultural machines, and more particularly to a machine designed for cutting cotton stalks or stubbles, to facilitate the clearing and conditioning of the soil for further planting.

An important object of the invention is to provide a machine of this character including a rotary cutting blade operating in horizontal relation with respect to the ground surface, to cut stalks or stubbles close to the ground.

Another important object of the invention is to provide a frame work which is so mounted on the machine that the stalks will be held in upright positions for contact by the rapidly rotating blades of the machine.

Still another object of the invention is to provide means for raising or lowering the body of the machine, and consequently adjusting the operating position of the rotary blades.

Still another object of the invention is to provide a guard blade at one side of the wide mesh frame, which blade causes the stalks cut to be thrown into the path of travel of the blades where the stalks are further cut into small pieces for more even distribution over the ground surface.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

Referring to the drawings:

Figure 1 is a plan view of an agricultural machine, constructed in accordance with the invention.

Fig. 2 is a bottom plan view thereof.

Fig. 3 is a front elevational view of the machine.

Fig. 4 is a rear elevational view of the machine.

Fig. 5 is a sectional view on an enlarged scale taken on the line 5—5 of Fig. 1.

Referring to the drawings in detail, the machine comprises a wheel-supported platform 5 which is mounted on the frame 6 including an element as shown of U-shape which has rearwardly extended arms 7 formed with bearings 8, in which the shaft 9 operates, the shaft 9 having right-angled ends 10 formed with stub shafts on which the wheels 11 operate.

The frame also includes forwardly extended bars 12 that connect with the main portion of the frame and converge towards the front of the machine where they are connected with the draw bar 13, by means of which the machine is pulled over the field in which the stalks are being cut.

The platform 5 is also supported on the rectangular frame embodying angle bars 14 that have their open sides disposed rearwardly, the angle bars providing a support for the guard 15 which has its rear end curved, as clearly shown by Fig. 1 of the drawings. The guard 15 is constructed of rods of wide mesh and extends downwardly an appreciable distance below the rotary cutting blades, to be hereinafter more fully described, so that the cutting blades will cut the stalks close to the ground surface. The guard also includes an upper guard section indicated generally by the reference character 16, which upper guard section provides means to prevent the stalks from being thrown upwardly beyond the frame.

Mounted on the frame is a gear housing 17 in which suitable gearing is mounted for operating the vertical shaft 18 on which the arms 19 are connected, the arms 19 supporting the cutting blades 20 that are flat to operate in parallel relation with the ground surface.

The gearing within the gear housing 17, includes a shaft S on which the pulley 21 operates, the pulley 21 being rotated by means of the belts 22 also operating over the substantially large pulley 23. The pulley 23 is secured to one end of the shaft 24 that is mounted in the bearings 25, that in turn are supported on the frame 26 that rises from the platform 5 near the front end thereof.

The reference character 27 indicates the power shaft of the machine, which is operated from the power take off of the tractor towing the machine. A universal coupling 28 connects the shafts 24 and 27 in such a way that movement of either the tractor or machine towed by the tractor, may be vertically.

Rising from the platform, 5, at a point intermediate the side edges thereof, is the standard 29 that has a threaded sleeve 30 pivotally mounted at the upper end thereof, the sleeve 30 accommodating the threaded shank of the rod 32 that has a crank handle 33 at one end thereof. The rod 32 also operates in the bearing sleeve 34 that is pivotally connected to the upper ends of the arms 35 which arm 35 has its lower end secured to the shaft 9. In order that the standard 29 will be held in an upright position against swinging movement, a brace rod 36 is provided, which brace rod connects with the standard 29 at one of its ends, while the opposite end of the brace rod is secured to the platform 5. The guard 15 also includes a curved guard plate 37 which is disposed vertically and arranged along one side of the guard, the guard plate 37 extending to a point flush with the lower edge of the guard 15, as clearly shown by Figs. 1, 3, 4 and 5 of the drawings. This guard plate provides a stop for the material which is cut and thrown in the direction of travel of the blades obstructing the passage of the cut material from the guard, the guard acting to also return the cut stalks and vines into the path of travel of the blades to be further cut into small pieces.

Due to this construction, it will be seen that by rotating the crank handle 33, the rod 32 may be moved towards or away from the standard 29 swinging the shaft 9 within its bearings to raise or lower the platform of the machine with respect to the ground surface over which the machine is moving.

In the operation of the machine, the rod 32 is operated to properly adjust the frame and consequently the blades 20 with respect to the surface over which the machine is moving, to cut the stalks at a desired point.

The machine is now towed over the surface, the shaft 27 transmitting movement to the pulley 23, which in turn operates the pulley 21 through the belts 22. Rotary movement is now transmitted to the horizontal shaft of the gearing, which in turn rotates the shaft 18 and the arms 19 with the cutting blades 20.

As these blades rotate rapidly, it will be seen that the stalks and vines will be cut into fine pieces, the cut stalks being thrown against the guard plate 37 arranged in one side of the frame, which causes the material to be thrown back into the path of travel of the rapidly rotating blades cutting the stalks into fine pieces.

The guard 15 being constructed of wire mesh material of exceptionally wide mesh, will tend to contact the stalks and dried vegetation, holding them in upright positions to be readily cut by the rapidly rotating blades.

Having thus described the invention, what is claimed is:

1. A stalk cutting machine having a generally horizontal frame, arms extending rearwardly from said frame having free rear ends, a transverse shaft including forwardly extending end members, means pivoting said shaft to the said free rear ends, wheels mounted on said end members with their axis of rotation forwardly of said free rear ends, a stalk-cutter disposed below said frame and shaft rotatable on an approximately vertical axis disposed forwardly and relatively close to a generally transverse line passing through the zones of connection of said arms with said frame, means supported on said frame to rotate said cutter, a guard means for the material being cut depending from said frame in operative association with said cutter and including a portion disposed about said cutter and extending rearwardly beyond said cutter and said shaft, and means connected to said shaft and to said frame operable to pivotally swing said shaft to thereby regulate the depth of cutting.

2. A stalk cutting machine having a generally horizontal frame, arms extending rearwardly from said frame having free rear ends, a transverse shaft including forwardly extending end members, means pivoting said shaft to said end free rear ends, wheels mounted on said end members with their axis of rotation forwardly of said free rear ends, a stalk-cutter disposed below said frame and shaft rotatable on an approximately vertical axis disposed forwardly and relatively close to a generally transverse line passing through the zones of connection of said arms with said frame, means supported on said frame to rotate said cutter, and generally open mesh guard means for the material being cut depending from said frame in operative association with said cutter including a portion disposed about said cutter and extending rearwardly beyond said cutter and said shaft, said guard means also including an upper section guarding the area from the margin of the guard means to said imaginary line, an arm rising from said shaft and extending through said upper section, a standard rising from said frame forwardly of said arm, and means operatively connected to said arm and said standard in order to pivotally swing said shaft to thereby regulate the depth of cutting.

3. A stalk cutting machine having a generally horizontal frame, a platform on said frame, said frame at the rear including a U-shaped element having arms extending rearwardly with respect to said platform having free rear ends, a transverse shaft including forwardly extending end members, means pivoting said shaft to said free rear ends, wheels mounted on said end members with their axis of rotation forwardly of the said free ends, a stalk-cutter disposed below said frame and shaft rotatable on an approximately vertical axis disposed at the rear portion of said platform, means supported on said platform to rotate said cutter, a generally open mesh guard means for the material being cut depending from said frame rearwardly of said platform in operative association with said cutter including a portion disposed about said cutter and extending rearwardly beyond said cutter and said shaft, said guard means including an upper section guarding the area between the margin of the guard means and said platform, said guard means including a portion depending at one side of the platform, and terminating at the rear in an inwardly deflected solid portion rearwardly of the platform, an arm rising from said shaft and extending through the upper section, a standard rising from said frame adjacent the rear of said platform, and means articulately connected to the said arm and standard operable to pivotally swing said shaft to thereby regulate the depth of cutting, and means mounted on said platform forwardly of said axis adapted to be driven by a source of power.

JAMES O. YEAGER.
GARLAND A. YEAGER.

REFERENCES CITED

The following references are of record in the file of this patent:

UNITED STATES PATENTS

| Number | Name | Date |
|---|---|---|
| 35,214 | Campbell | May 13, 1862 |
| 1,849,953 | Phalen | Mar. 15, 1932 |
| 2,198,526 | Cockburn | Apr. 23, 1940 |
| 2,208,972 | Goodall | July 23, 1940 |
| 2,403,236 | Phelps | July 2, 1946 |
| 2,489,204 | Sprick et al. | Nov. 22, 1949 |
| 2,556,446 | Roach | Jan. 12, 1951 |

FOREIGN PATENTS

| Number | Country | Date |
|---|---|---|
| 566,318 | Great Britain | Dec. 21, 1944 |